Feb. 21, 1950 J. E. FELDMAN 2,498,074
METHOD OF MAKING NOVELTY DISPLAYS
Filed May 28, 1948
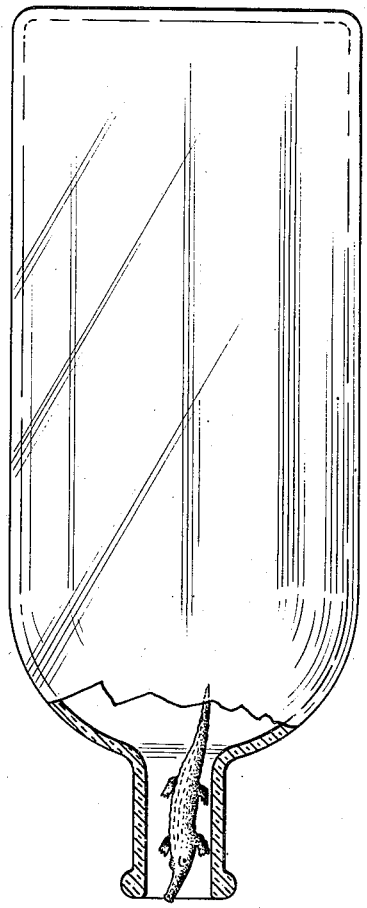
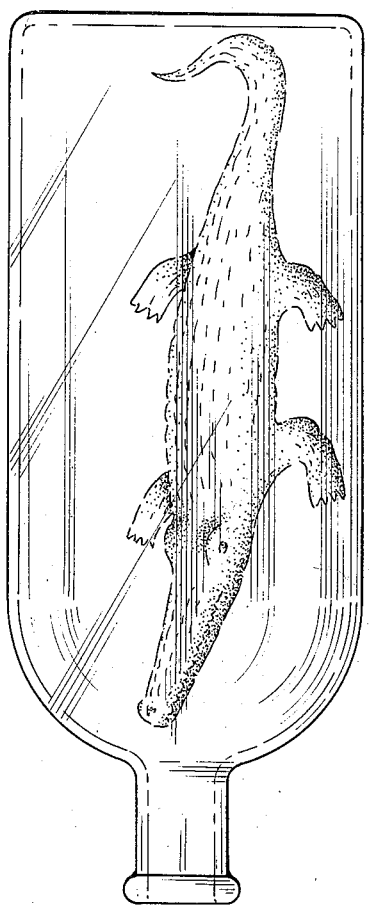
FIG. 1 — SHAPE MINIATURE OF EXPANDABLE RESIN BODY
FIG. 2 — INSERT MINIATURE IN NARROW-MOUTH DISPLAY CONTAINER
FIG. 3 — EXPAND MINIATURE IN DISPLAY CONTAINER
INVENTOR.
JOHN E. FELDMAN
BY Robert J. Patterson
ATTORNEY Patented Feb. 21, 1950

2,498,074

UNITED STATES PATENT OFFICE 2,498,074

METHOD OF MAKING NOVELTY DISPLAYS

John E. Feldman, Garfield, N. J., assignor to United States Rubber Company, New York, N. Y., a corporation of New Jersey Application May 28, 1948, Serial No. 29,885

2 Claims. (Cl. 18—47.5)

This invention relates to a novel display device for advertising, educational, entertainment and similar purposes, and to the method of making same.

More particularly, this invention relates to a display device and the like comprising a relatively large article in a transparent container having a relatively small opening, the said article being too large to be passed through the small opening in the container.

In accordance with this invention, my novel device is produced by forming a miniature of the desired article from an expandable resin body, inserting the said miniature through the small mouth of a transparent display container, and expanding the miniature article in the container to many times its original size by the application of heat. Upon cooling, the article retains its expanded size and shape, and the size of the article is much too great to permit the article to be passed through the relatively narrow mouth of the display container.

The accompanying drawing is a diagrammatic representation of the essential steps of my invention.

In the drawing:

Fig. 1 shows the miniature article which has been formed under heat and pressure and which contains the gas liberated during its formation by thermal decomposition of the chemical agent, said gas being in the form of very small bubbles under pressure.

Fig. 2 shows insertion of the formed miniature through the small mouth of the display container, and Fig. 3 shows the final expanded article in the display container.

Considering a specific embodiment of the invention in more detail, my novel display device is produced as follows: A paste or viscous fluid (plastisol) is formed from a finely powdered thermoplastic resin, such as a vinyl resin, and a plasticizer in which the resin will not readily dissolve at room temperature but in which the resin will dissolve at elevated temperature. A small quantity of a blowing agent, that is, a chemical substance which is capable of liberating a gas on heating to elevated temperature, is included in the mixture. A mold which has the shape of the desired article, but which is only a small fraction, say about 1/25, the size of the desired article, is filled with this paste. The mold is closed and placed in a press, and heated under pressure to a temperature sufficiently high to cause the resin to dissolve in the plasticizer and to cause the blowing agent to liberate gas. The mold is thereafter cooled, while continuing to maintain the mold under pressure. When the mold is cooled substantially below the softening temperature of the resin the mold may be opened to yield the shaped but unexpanded thermoplastic article, which is now in the solid state due to solution of the resin in the plasticizer under the influence of the heat. The article is a miniature replica of the desired display article, and the gas which was generated by decomposition of the blowing agent during the heating step is contained under pressure in very small pores permeating the rigid thermoplastic mass. Referring to the accompanying drawing, this step is illustrated in Fig. 1, wherein a miniature representation of an alligator is formed. The small shaped article is now introduced through a small mouth in a transparent display container. This step is shown in Fig. 2 in the drawing. Heat is now applied to the article, suitably by pouring warm water into the container, to soften the thermoplastic resin and cause the article to expand to many times, e. g., 25 times, its original size, under the influence of the pressure of the gas contained in the innumerable cells throughout the body of the article. This step is shown in Fig. 3 in the drawing. When the article is cooled, the thermoplastic resin becomes rigid once more, and the article substantially retains its expanded size and shape indefinitely. In this expanded state, the size of the article is much too great to permit the article to be passed through the relatively narrow mouth of the display container.

Instead of molding the miniature expandable body directly in the desired shape, I may form the miniature article in other ways, such as by cutting, or carving, or stamping, etc., the desired miniature shape from a previously formed expandable thermoplastic resin body.

The expandable thermoplastic resin body may be prepared from various mixtures of resins, plasticizers and blowing agents known to the art.

For example, I may employ various known thermoplastic vinyl resins, preferably polyvinyl chloride or copolymers of vinyl chloride with 2 to 15% of vinyl acetate or the like, or mixtures of various thermoplastic resins having suitable physical properties. I prefer to use polyvinyl chloride itself.

Various plasticizers known in the resin art may be used in my process, e. g., di-(2-ethylhexyl) phthalate, tricresyl phosphate, dibutyl phthalate, and other high boiling esters, ethers, etc. The plasticizer employed should be one which is capable of being mixed with the finely powdered resin without substantially dissolving same until heat is applied to the mixture.

The quantity of plasticizer used should be sufficient to form a butter-like paste or a viscous liquid and such that a normally solid product results after the heating step. The proportion of plasticizer may range from ½ to 4 parts per part of the resin. Usually a proportion of from 65 to 100 parts of plasticizer per 100 parts by weight of polyvinyl chloride is employed.

The blowing agent which is employed in the expandable resin stock is preferably a nitrogen-producing blowing agent, preferably alpha,alpha'-azobisisobutyronitrile, although other nitrogen-producing blowing agents, e. g., diazoaminobenzene, 1,3-bis(o-xenyl)-triazene, 1,3-bis(p-xenyl)-triazene, etc., may be employed. Blowing agents which produce other gases such as ammonia or carbon dioxide may be used if desired. Among such may be mentioned sodium bicarbonate with oleic acid, ammonium carbonate, mixtures of ammonium chloride and sodium nitrite, etc.

The quantity of the blowing agent used will vary with the density or degree or cellularity desired in the final article and the particular blowing agent employed. Generally from 12 to 40 parts, for example, of alpha, alpha'-azobisisobutyronitrile per 100 parts by weight of resin are suitable.

It is also advantageous to employ a small quantity of a heat or light stabilizer, such as 2 to 5 parts of calcium stearate per 100 parts by weight of polyvinyl chloride.

The plasticizer, the powdered thermoplastic resin and other ingredients may be mixed at room temperature by any known means to form a butter-like paste or viscous liquid, which is capable of being gelled by heating a short time (e. g., 5 to 15 minutes) at elevated temperatures (e. g., 200-350° F.). During this heating step the material is confined in a mold under pressure, and the gas which is produced by the chemical blowing agent as a result of the heating is contained in very fine pores throughout the resinous mass. The mass is cooled while it is in the mold until it is rigid enough to retain the gas without expanding substantially.

After inserting the article in a small mouth transparent container, the expansion step may be carried out by heating the article by any known means to a temperature sufficiently high to soften the resin. For example, the expansion may be carried out by placing the assembly in a heated fluid medium, as in a warm oven, or warm water may be poured directly into the container. A temperature of 50° to 100° C. will generally be found suitable for this purpose, depending on the softening temperature of the particular resin composition used.

The following example illustrates my invention in more detail.

The following formulation is prepared:

| | Parts by weight |
|---|---|
| Resin (polyvinyl chloride) | 100 |
| Stabilizer (calcium stearate) | 3 |
| Plasticizer (di-2-ethylhexyl phthalate) | 70 |
| Blowing agent (alpha,alpha'-azobisisobutyronitrile) | 30 |

The resin, stabilizer and blowing agent are dry mixed, whereupon the plasticizer is stirred in. The mix is passed three times through a meat chopper to transform it into a homogeneous paste. Both halves of a split mold having a cavity in the form of an alligator are filled with the paste, a slight excess being added to one mold half to insure a coherent article being formed when the mold is closed. The filled and closed mold is heated eight minutes in a press at a platen temperature of 330° F. (90 lbs. steam) at a mold closing pressure of 3600 p. s. i.; it is then cooled seven minutes whereupon it is opened and the miniature alligator is removed. The alligator is passed through the mouth of a narrow mouth bottle. Warm water (85° C.) is poured into the bottle, whereupon the alligator expands slowly to about 25 times its original size. The water is poured out after about 15 minutes, and the alligator, which is now much too large to be passed through the mouth of the bottle, retains its expanded shape and size indefinitely.

The resinous material (preferably a polyvinyl chloride-plasticizer mixture) used should be one which at ordinary temperatures, say at room temperature, is sufficiently hard and rigid to retain the gas so that the miniature will retain the gas therein until the expanding step.

My invention is preferably carried out with a so-called plastisol, i. e., a paste or dispersion of the powdered resin and a plasticizer therefor which is capable of dissolving the same upon heating to moderately elevated temperatures to form a solution which upon cooling to room temperature assumes a hard rigid form. The techniques of using plastisols are now well-known. See for example the article "A New Technique in Coatings," by G. M. Howell and R. W. Quarles, appearing in "Official Digest," published by the Federation of Paint and Varnish Production Clubs, issue #263, December, 1946.

The final expanded body is rigid and unyielding and cannot be withdrawn through the relatively small opening of the transparent container. The final body has a closed-cell type of expanded structure.

It will be understood that the ratio of the final size of the expanded article to the size of the miniature may vary within wide limits so long as the miniature is capable of being passed through the opening while the final article is not; the ratio of final to miniature volumes may conveniently range from 50:1 to 2:1. It will be understood that the degree of expansion will depend upon many factors including amount and type of blowing agent, conditions of blowing and expansion, permeability of the plastic to the liberated gas, etc.

From the foregoing it is evident that my improved method of putting a large object into a small-mouth container has many advantages. The process may be carried out easily with readily available thermoplastic materials which lend themselves to production of an infinite variety of shapes with various color or surface texture effects. Multi-colored articles may be readily prepared by my method by filling different parts of the mold with differently pigmented plastic mixtures. For instance, the alligator shown in the example may be made with a green or mottled green back and a yellow underside by filling the upper and lower halves of the mold with suitably pigmented plastic mixes. I believe that no prior method is capable of making large display articles in narrow mouth containers so conveniently and with such a variety of interesting effects as the present invention.

My display articles are particularly advantageous as an advertising means for those products which are normally sold in small mouth glass containers.

Having thus described my invention, what I claim and desire to protect by Letters Patent is:

1. A method of forming a relatively large solid object in a relatively small-mouthed transparent container, said object being of such size and characteristics that it cannot be passed through the mouth of said container, which comprises molding under heat and pressure a plastic composition comprising polyvinyl chloride, a plasticizer therefor, and a chemical blowing agent capable upon heating of generating an expanding gas, into the shape of said object but in miniature thereof and of such size that it can be introduced through the mouth of said container, conducting said molding step at a temperature sufficiently elevated to decompose said blowing agent with generation of said gas and to effect solution of said polyvinyl chloride in said plasticizer to form a material which is solid at room temperature, conducting said molding step under such pressure that said gas is held in the resulting plastic composition, cooling the molded article while confined in the mold until it is rigid enough to retain said gas without expanding substantially, introducing the cooled molded miniature article into said transparent container through the mouth thereof, and then heating said article in said container and causing it to expand to said relatively large solid object of such size and characteristics that it cannot be passed through the mouth of said container.

2. A method for forming a relatively large solid object in a relatively small-mouthed transparent container, said object being of such size and characteristics that it cannot be passed through the mouth of said container, which comprises molding under heat and pressure a plastic composition comprising a thermoplastic resin, a plasticizer therefor, and a chemical blowing agent capable upon heating of generating an expanding gas, into the shape of said object but in miniature thereof and of such size that it can be introduced through the mouth of said container, conducting said molding step at a temperature sufficiently elevated to decompose said blowing agent with generation of said gas and to effect solution of said resin in said plasticizer to form a material which is solid at room temperature, conducting said molding step under such pressure that said gas is held in the resulting plastic composition, cooling the molded article while confined in the mold until it is rigid enough to retain said gas without expanding substantially, introducing the cooled molded miniature article into said transparent container through the mouth thereof, and then heating said article in said container and causing it to expand to said relatively large solid object of such size and characteristics that it cannot be passed through the mouth of said container.

JOHN E. FELDMAN.

REFERENCES CITED

The following references are of record in the file of this patent:

UNITED STATES PATENTS

| Number | Name | Date |
|---|---|---|
| 2,023,204 | Munters | Dec. 3, 1935 |
| 2,345,144 | Opavsky | Mar. 28, 1944 |
| 2,353,361 | Ballestero | June 27, 1944 |
| 2,409,910 | Stober | Oct. 22, 1946 |
| 2,442,940 | Staudinger | June 8, 1948 |

FOREIGN PATENTS

| Number | Country | Date |
|---|---|---|
| 429,316 | Great Britain | May 28, 1935 |

OTHER REFERENCES

"Expanded Polystyrene," Modern Plastics, March 1945; page 106.